July 23, 1946.  R. L. DOAN  2,404,622
WELL LOGGING APPARATUS
Filed March 10, 1942   2 Sheets-Sheet 1
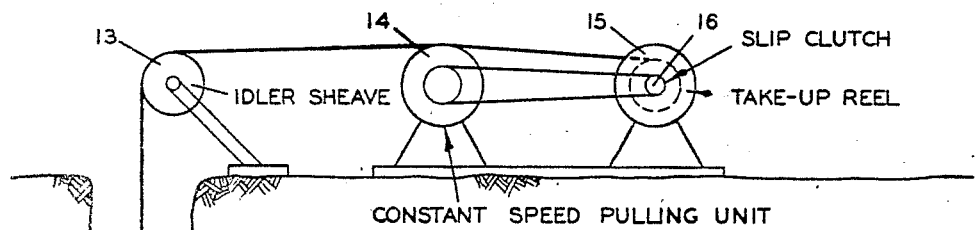
FIG. 1
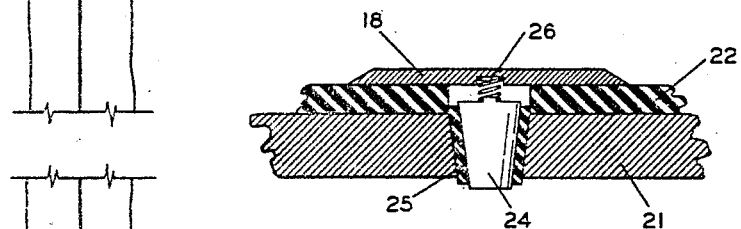
FIG. 2
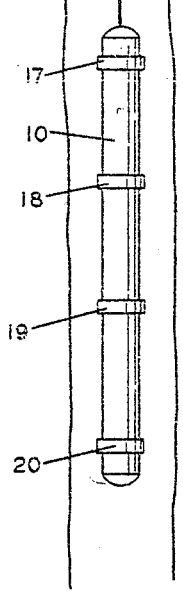
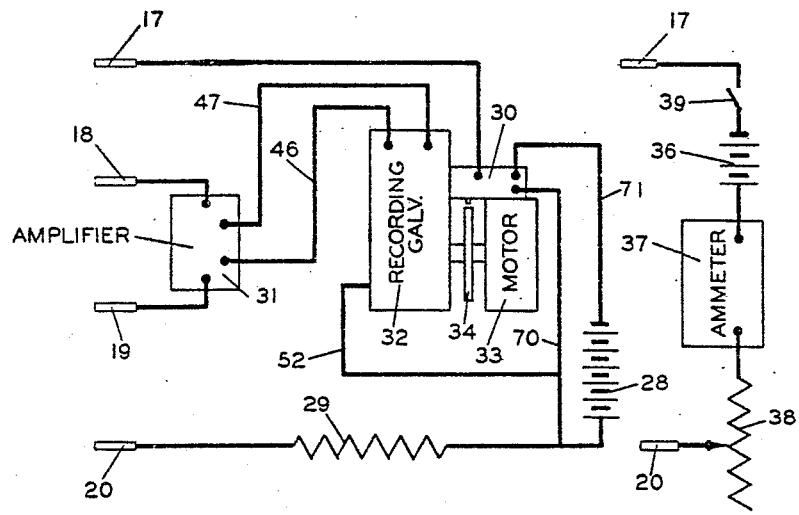
FIG. 3   FIG. 4
INVENTOR
RICHARD L. DOAN
BY Hudson, Young & Yinger
ATTORNEYS July 23, 1946.  R. L. DOAN  2,404,622
WELL LOGGING APPARATUS
Filed March 10, 1942  2 Sheets-Sheet 2
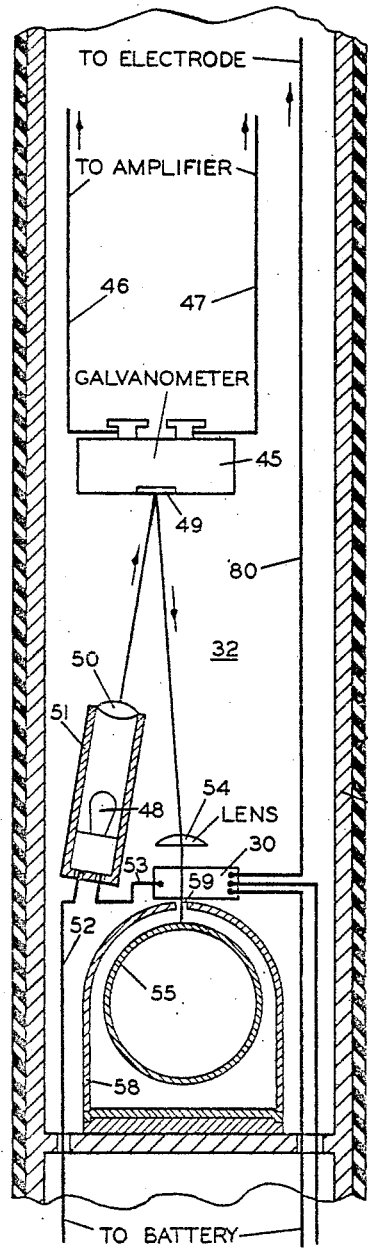
FIG. 5
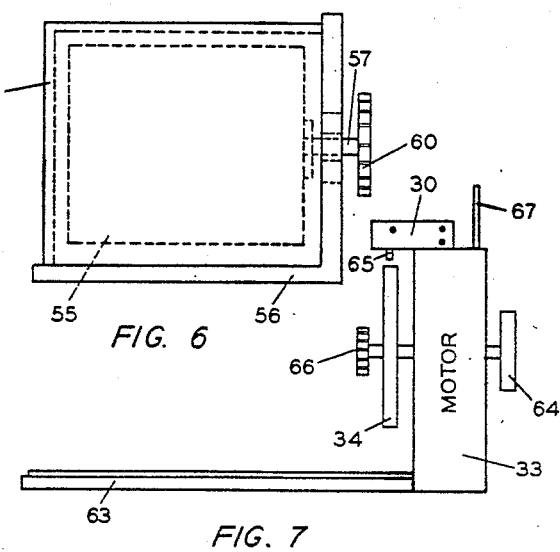
FIG. 6
FIG. 7
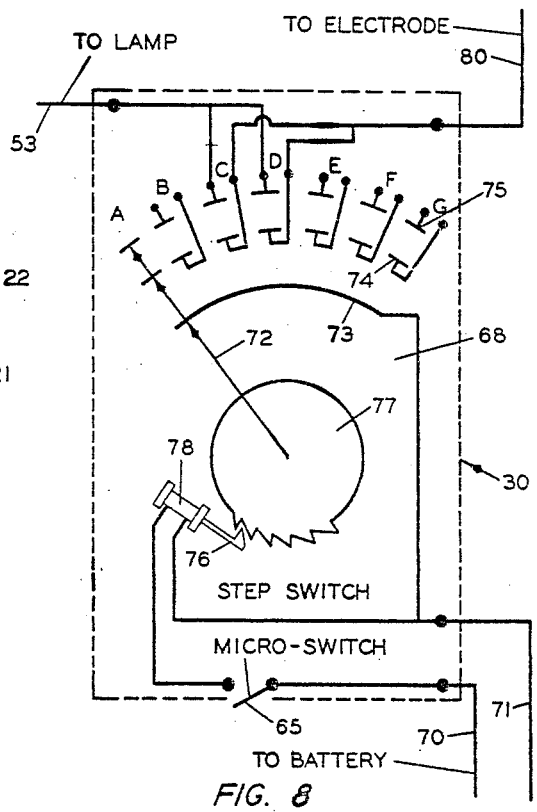
FIG. 8
INVENTOR
RICHARD L. DOAN
BY Hudson, Young & Yinger
ATTORNEYS Patented July 23, 1946

2,404,622

UNITED STATES PATENT OFFICE 2,404,622

WELL LOGGING APPARATUS

Richard L. Doan, Bartlesville, Okla., assignor to Phillips Petroleum Company, a corporation of Delaware Application March 10, 1942, Serial No. 434,124

1 Claim. (Cl. 175—182)

The present invention relates to an improved method and apparatus for electrically surveying a bore hole.

Present methods of electrical logging a bore hole utilize an insulated conductor cable between the apparatus in the bore hole and the equipment at the surface of the earth. The insulated conductors establish electrical communication between the electrodes in the well bore and the recording instruments and power source at the surface of the earth. The electrical logging equipment used commercially is complicated and is expensive in first cost and in operation. Companies have been formed to supply the well logging service to the oil industry. The companies maintain district offices and well logging equipment at scattered points over the oil producing territory. The locations of the offices and the equipment supplied to each is determined more or less by the demand for the service. Whenever a producer desires to have a well logged, one or more trucks carrying the well logging equipment is sent out from the nearest district office. The charge made for the service is based on both the mileage covered by the trucks and the depth of hole logged. In the case of remotely located wildcat wells, the logging equipment may have to travel several hundred miles by truck and perhaps finish the journey traveling on a barge or behind a tractor.

Obviously this kind of set-up possesses a number of disadvantages for the company drilling the well, the most important of which is the practical limitation thus placed on the frequency with which logging information can be obtained as the hole goes down. It is almost certain that, were it not for the cost involved in bringing a logging truck back to the well repeatedly, most holes of a wildcat or semi-wildcat nature would be logged much more frequently than they are at present.

The present invention provides an instrument for logging a bore hole by means of which electrical well logging becomes a tool of the drilling crew, rather than an expensive service to the producer. The instrument is a self-contained unit which does not require the use of insulated electrical conductors and which may be moved along the bore hole by means of the conventional wire line frequently used around drilling rigs. The instrument lends itself readily to the needs of the geologist because it may be kept at the drilling rig and run into the bore hole as often as desirable. On the deeper holes the well log may be made during each round trip with the drill pipe when the bit is removed from the hole.

An object of this invention is to provide improved apparatus for electrically surveying a bore hole.

Another object of this invention is to provide an improved method of electrically surveying a bore hole.

Still another object of this invention is to provide an improved self-contained instrument for electrically surveying a bore hole.

A further object of this invention is to provide such an instrument which may be lowered into the bore hole and moved along the well by means of a conventional wire line.

Other objects and advantages of the present invention will be apparent from the following detailed description and the accompanying drawings.

Figure 1 is a diagrammatic elevational view of apparatus of my invention showing the surveying instrument in operating position along a bore hole.

Figure 2 is a partial cross section of the instrument housing at an electrode.

Figure 3 is a diagrammatic illustration of the apparatus and electrical circuit contained within the instrument housing.

Figure 4 is a diagrammatic illustration of an alternative apparatus and the corresponding electrical circuit which may be contained within the instrument housing.

Figure 5 is an elevation of the elements of the recording galvanometer.

Figure 6 is an elevation of the film drum of the recording galvanometer.

Figure 7 is elevation of the timing mechanism of the recording galvanometer.

Figure 8 is a diagrammatic showing of the switching mechanism of the logging apparatus.

The present invention accomplishes the objects by providing a surveying instrument containing essentially an electric power source, a recording potentiometer or recording ammeter, an an electrode system in contact with the fluid normally filling the bore hole. The power source and recording equipment is enclosed in a fluid tight housing of sufficient strength to withstand the external pressures encountered in deep wells of the class known as oil wells. The electrical logging equipment developed heretofore, having the recording instruments at the surface of the earth, provides for correlation between the record and the position of the electrodes along the bore hole by mechanically or electrically synchronizing the chart with a measuring sheave at the surface. In the present invention, novel apparatus is provided for the correlation between the position of the instrument and the record without mechanical or electrical connections therebetween. The logging speed or rate of travel of the electrodes along the well bore is maintained substantially constant. Correlation is then made by means of time lines on the record. Another desirable feature provided in the present invention is a mechanism for switching on the power after an elapsed time sufficient to permit lowering the instrument to the desired position in the bore hole and for cutting off the power source after the desired section of the bore hole has been logged.

The invention will be more readily appreciated by reference to the drawings. With reference to Figure 1, the numeral 10 designates the surveying instrument suspended in the bore hole 11 by the "wire line" 12. The wire line passes over the idler sheave 13 at the surface of the earth and around the drum 14 of the pulling unit which may be driven at a constant speed during the logging operation. The wire line is taken up or payed out from the take-up reel 15 which is provided with a conventional slip clutch driving pulley 16 to maintain constant tension on the wire line. By means of the constant speed pulling unit, the surveying instrument may be moved along the well bore at a predetermined, substantially constant rate. The electrodes 17, 18, 19, and 20 are in the form of metallic bands encircling the instrument housing. Although four electrodes are shown in the drawings, more or less may be employed as desired depending upon the electrode arrangement desired. While the electrodes are shown as relatively short bands, the electrodes may take various alternative forms. For example, the electrode 17 may be replaced by a section of armored cable attached to the instrument in which the metallic sheath acts as an electrode as in the patent to J. J. Jakosky, 2,140,798. The electrodes are electrically insulated from one another and from metallic parts of the instrument housing as will be evident from Figure 2 showing a partial cross section of the instrument housing at an electrode, for example electrode 18. The instrument housing comprises a metallic wall 21, of sufficient strength to withstand the external fluid pressure, protected from contact with the well fluid by the layer of electrical insulation 22. The metallic band 18 comprising one of the electrodes is insulated from the metallic wall 21 by the insulation 22. A tapered hole 23 in the metallic wall 21 receives a frustro-conical plug 24 of electrically conductive material surrounded by electrical insulation 25 which serves to prevent leakage of fluid into the housing. The plug 24 is held securely in place by the spring 26 between the plug and the band electrode 18. Any external fluid pressure to which the plug is subjected during the logging operation serves only to compress the electrical insulation 25 to prevent leakage into the housing.

Any number of electrodes may be used, for example Figure 3 shows diagrammatically the apparatus used when four electrodes are employed and Figure 4 shows suitable apparatus for use when two electrodes are used. In Figure 3, electrical potential from the battery may be applied to the current electrodes 17 and 20 through the resistance 29 and the switching mechanism 30. The battery 28 is intended to represent a source of either direct or alternating electrical current. The electrodes 18 and 19 serve as potential pickup electrodes and are connected to an amplifier. The output of the amplifier is connected to the galvanometer circuit of the recording galvanometer 32. The record sheet of the recording galvanometer is driven by the motor 33 which is provided with a timing disk 34 to control the operation of the switching mechanism as will be described subsequently in more detail. The switching mechanism comprises a timing device which may be set to make the current circuit after the lapse of a desired time interval, maintain the circuit during the time required for logging, and to break the current circuit at the end of the logging time.

With reference to Figure 4, two of the electrodes, for example electrodes 17 and 20, are used for the logging. While any two of the electrodes may be used, the wider spacing of the two end electrodes 17 and 20 is preferable to insure the desired depth of penetration of the electric current into the formation. Electrical potential from the battery or power source 36 is applied between the electrodes through the recording ammeter 37 and the variable resistance 38. The switch 39, controlled in any suitable manner, is interposed in the circuit to make or break the circuit as desired.

In operation of the device shown in Figure 3, the timing disk 34 and the switching mechanism 30 are adjusted to the proper time intervals and the motor 33 placed in operation prior to running the instrument into the bore hole. The instrument is run into the bore hole to the lowest point from which the logging is to start during the time period preceding the making of the current circuit. When the circuit is made by the switching mechanism, the current electrodes 17 and 20 are energized by application of potential from the battery 28. The electrodes 17 and 20 are in contact with the electrically conductive drilling fluid contained in the bore hole. Electric current flows between the electrodes, a large part of the current flowing through the earth formations surrounding the bore hole. The resistance 29 is relatively high in comparison with the external resistance and insures a substantially constant current flow. The flow of current induces a difference in potential between the potential electrodes 18 and 19 in addition to any potential difference which may exist from any other causes. The potential difference is to some extent indicative of the physical properties of the adjacent formation and forms the basis for the electric well log. The potential difference is recorded by the recording galvanometer to form the record known as the well log. When the current circuit has been made, current flow is established between electrodes 17 and 20 and the recording galvanometer starts recording the instantaneous values of the potential difference between the potential electrodes 18 and 19. The motor 33 drives the chart of the recording galvanometer at constant speed giving a plot of potential difference vs. time. When the flow of current is established, as determined by the timing disk, the pulling unit 14 at the surface is started and the instrument moved at substantially constant speed upward along the well bore to the upper end of the section to be logged. After the lapse of the predetermined logging time, the current circuit is broken by the switching mechanism, and the instrument is removed from the bore hole. By noting the depth at which the logging was started and stopped and the logging speed, the record obtained by the recording galvanometer may be correlated with the depth.

When the two electrodes are used as shown in

Figure 4, the operating procedure is substantially the same as for the apparatus of Figure 3. The variable resistance 38 is relatively low compared with the external resistance. Consequently, the current flowing between the electrodes 17 and 20 varies as the external resistance between the electrodes varies. The external resistance is indicative of physical properties of the formation adjacent the drilling mud. Hence, variations in the external resistance, which are evidenced by variations in the current flow through the electrical circuit, are indicative of variations in the physical properties of the formations traversed by the bore hole along which the instrument travels. The variations in current flow are recorded on the recording ammeter and may be correlated with the depth as with the four electrode system.

The recording system employed for making the record of the electric well log may be of any suitable type, for example optical or mechanical. The conventional mechanical recorder in which the trace is scratched directly on sensitized or coated paper has the advantages of ruggedness and simplicity. The mechanical recorder may be used with the present apparatus, particularly where using the system of Figure 4 in which it forms a part of the recording ammeter. The mechanical recorder has the disadvantage of requiring considerable power for its operation. Therefore, for the apparatus of Figure 3, the optical recording system forming a part of this invention and illustrated in Figure 5 is preferred. The galvanometer 45 is attached to the wall 21 of the instrument for support and is of the mirror type. The terminals of the galvanometer are electrically connected to the output of the amplifier 31 by the leads 46 and 47. A beam of light projected from the lamp 48 is directed on the mirror 49 of the galvanometer through the lens 50. The lamp 48 is enclosed in the tubular member 51 and is supplied with electric current from the battery 28 by the conductors 52 and 53, as determined by the switching mechanism 30. The beam of light from the lamp is reflected from the mirror to the cylindrical lens 54 which focuses the beam of light to a small spot on the photographic recording paper carried on the drum 55 of the recording equipment. Any deflection of the galvanometer causes the spot of light to move across the record paper along a line parallel to the axis of the drum 55. During the taking of a log the drum is revolved slowly and at uniform speed by the motor 33. Therefore, there is produced a record of the variations in potentials between electrodes 18 and 19 as the instrument is moved along the bore hole. The camera, shown in detail in Figure 6, comprises the cylinder 55 mounted on the frame 56 through the medium of the shaft 57. The camera is supplied with a light-excluding removable cover 58, provided with a slit 59 along the top thereof to admit the spot of light for recording. The drum 55 of the camera is rotated by the shaft 57 to which is attached the turning gear 60. To facilitate changing recording paper, the camera may be removed from the instrument housing independently of the recording equipment. When in position in the instrument, the camera is carried by the base plate 63 to which is attached the motor 33. The motor preferably is of the spring-driven clockwork type which may be wound by the key 64. Attached to the motor is the micro-switch 65 forming a part of the switching mechanism 30. The driving gear 66 and the timing disk 34 are driven at a constant speed by the motor. A short cam or raised place is provided on the peripheral edge of the timing disk. On each revolution of the timing disk, the cam surface engages the micro-switch, closing the switch for a short period of time. A control lever 67 allows the driving gear 66 to be engaged or released at will.

Figure 8 shows the details of the switching mechanism which controls the energizing of the electrodes and the recording system. The switching mechanism 30 comprises the micro-switch 65 and a two bank stepping sequence switch 68 designated "step switch" in the figure. Electric current from the battery 28 is supplied to the switching mechanism from the battery leads 70 and 71. The step switch is a well known type having essentially a contact arm 72, a solid contact bar 73, and two banks of contacts 74 and 75 comprising a plurality of contact points, A, B, C, D, E, F, G, in each bank. The contact arm is moved sequentially from position A to a subsequent position along the contact points by the action of the solenoid operated pawl 76 on the toothed wheel 77. When the micro-switch 65 is closed by the cam on the timing disk, electric current flows through the solenoid 78 for a short time actuating the pawl 76. Thus each time the timing disk makes one revolution, the step switch advances one step. The contact arm 72 is connected to one pole of the battery through the lead 71. Each contact point in the two banks is provided with a separate terminal from which a lead may be connected to the conductor 80 leading to electrode 17 or to the conductor 53 leading to the lamp 48. As many leads as desired may be used between the contact points and the conductors as will be apparent from the description of the operation.

The timing disk and the switching mechanism comprise the interval timer by which the instrument may be controlled. As a specific example, the driving gear and timing disk may be revolved by the motor at the rate of four revolutions per hour or one revolution every 15 minutes. If 20 minutes are required to make up the instrument and lower it into the bore hole to the point at which the logging is to start and the logging is to be carried on for 30 minutes, the operation of the interval timer is as follows. The driving gear and timing disk are disengaged by the control lever 67. The timing disk is then set by hand until one third revolution or 5 minutes is required to bring the cam into contact with the micro-switch to close the switch. The terminals corresponding to the contact points in the B and E positions are left blank while those in the C and D positions are connected to the conductors 53 and 80. The driving gear 66 is engaged, the instrument made up and lowered into the bore hole. At the end of 5 minutes the cam on the timing disk closes the micro-switch 65 and energizes the solenoid 78, advancing the step switch from position A to position B. No current flow is established at B since the terminals are not connected to the lead wires. After a lapse of twenty minutes, or 15 minutes later, the cam on the timing disk again closes the micro-switch advancing the step switch from position B to position C. At position C the circuits from the battery to the electrode 17 and from the battery to the lamp 48 in the recording galvanometer are completed and the electric logging may begin. At the end of the next 15 minutes, the step switch is advanced from position C to position D. Since the terminals corresponding to the contact points at the position D are connected to the conductors 53 and 80, the logging continues for another 15 minutes with the step switch at D position. When the step switch is again advanced, contact is made with the contact points at position E which are not connected to the conductors 53 and 80. The flow of electric current to the electrode and to the lamp of the galvanometer then ceases, and the instrument may be withdrawn from the bore hole.

After the log is obtained, the depth markings on the record may be readily made. The record is made on a drum moving at constant speed, for example two revolutions per hour. The speed of the pulling unit at the surface of the earth is constant and the depth at which the logging starts and stops may be determined at the surface of the earth by any of the several suitable well known means. The pulling of the electrode is started from known depth sometime after the timing mechanism in the well bore energizes the electrodes and recording mechanism. The instrument is stopped at known depth before the logging circuit is broken by the interval timer. For example, the logging time may be taken as 25 minutes of the 30 minute interval during which the circuits are energized. With a pulling speed of 20 feet per minute, 500 feet of bore hole may be logged under these conditions. If the section to be logged extends from 8,000 ft. to 8,500 ft., the instrument is lowered to the 8,500 ft. level before the circuits are energized. The instrument is held stationary at the starting point for a few minutes after the recording starts. The galvanometer trace appears as a straight line on the chart as long as the instrument remains in a fixed position along the bore hole. After the instrument has covered the 500 ft. to be logged it is again held stationary for the remaining few minutes until the power is switched off. The chart may then be graduated between the two straight lines appearing at the ends of the record and the corresponding depths entered at the graduations.

I claim:

In apparatus for electrically surveying a bore hole the subcombination of a fluid tight housing, having an inwardly tapered hole formed in its wall, an electrode band around the housing, covering the hole, an electrical connection from the electrode to the inside of the housing comprising a plug tapered to correspond to the taper of the hole and a spring between the electrode and the plug, and electrical insulating material between the electrode and the wall, and between the plug and the wall forming the walls of the hole, at least the insulating material between the plug and the wall forming a fluid tight seal.

RICHARD L. DOAN.